United States Patent [19]
Sundaram et al.

[11] Patent Number: 5,459,708
[45] Date of Patent: Oct. 17, 1995

[54] OPTICAL TAPE FOCAL PLANE STABILIZER

[75] Inventors: Ramesh Sundaram, Louisville; Archibald W. Smith, Boulder; Thai Nguyen, Thornton, all of Colo.

[73] Assignee: Storage Technology Corporation, Louisville, Colo.

[21] Appl. No.: 172,214

[22] Filed: Dec. 23, 1993

[51] Int. Cl.$^6$ ............................ G11B 17/02; G11B 21/16
[52] U.S. Cl. .......................... 369/244; 369/258; 369/292
[58] Field of Search ..................................... 369/244, 292, 369/95, 258, 259; 360/102, 103, 122; 359/811, 815, 819, 821, 896; 226/196, 197, 198, 199, 200

[56] References Cited

U.S. PATENT DOCUMENTS

| | | | |
|---|---|---|---|
| 4,237,505 | 12/1980 | Yamada et al. | 360/122 |
| 4,479,158 | 10/1984 | Froehlich et al. | 360/130.1 |
| 4,636,898 | 1/1987 | Suzuki et al. | 360/122 |
| 4,903,879 | 2/1990 | Noguchi et al. | 226/199 |

OTHER PUBLICATIONS

*Historical Perspective of Tape Head Contours*, F. William Hahn, Jr., IBM Corporation, pp. 21–27.

Primary Examiner—A. J. Heinz
Assistant Examiner—William R. Korzuch
Attorney, Agent, or Firm—Sterne, Kessler, Goldstein & Fox

[57] ABSTRACT

A tape stabilizer for stabilizing the focal plane area of an optical tape includes two radius contours adjacent to one another. As an optical tape passes across the stabilizer, an air bearing layer is formed. The air bearing layer suspends the tape above an apex of each contour and forms a stable tape surface between the apexes. It is at this stable tape surface that read and write operations can accurately be performed. An objective lens can be provided to focus a beam of light onto the tape for read and write operations.

11 Claims, 2 Drawing Sheets

OPTICAL TAPE FOCAL PLANE STABILIZER

BACKGROUND OF THE INVENTION

1. Field of the Invention

The present invention relates generally to optical tape data storage systems, and more specifically to a focal plane stabilizer that maintains the optical tape surface in the focal plane of an objective lens.

2. Related Art

The advent of optical storage technology brought about the ability to achieve greater recording densities than could be achieved using conventional magnetic recording technology. As a result, developers in the tape storage industry are turning to optical recording technology to meet their mass data storage needs.

One area of recent development is that of the optical tape drive. Such a tape drive uses an optical tape similar to magnetic tapes currently used in magnetic tape drives. Because the read and write operations are performed using electro-optics that focus a beam of light on the tape, tape alignment and stability are critical. To minimize the number of data storage and retrieval errors, it is important to maintain the area of the tape at which data is written to and/or read from (i.e., the focal plane area) in stable alignment with the focal plane of the objective lens.

One conventional approach to providing a stable focal plane is illustrated in FIGS. 1A–1C. FIG. 1A is a diagram illustrating a conventional focal plane stabilizer. Referring now to FIG. 1A, a conventional stabilizer 100 comprises a radius contour 102 over which the optical tape is positioned during read and write operations. The conventional contour 102 has a number of airholes 112 on a surface 110 of the contour. Air is forced out of these holes 112 to form an air cushion between the optical tape and the contour 102. This air cushion, known as a hydrostatic bearing, is intended to hold the tape steady during the read/write operations. In this configuration, the focal plane area is proximate to the contour apex.

FIG 1B is a diagram illustrating the relationship between the optical tape 122 and the radius contour 102. As a result of the air being forced through airholes 112, tape 122 is separated from radius contour 102 by a height "H." According to this conventional stabilizer, the separation H is a function of the number, pitch, and distribution of the airholes 112 and the airflow through them.

According to this design, the optical tape 122 is moved across the head in the direction illustrated by arrow A. The tape is stopped and data is written to the tape from edge to edge across the tape while the tape remains stationary. This is usually accomplished by scanning the objective lens across the width of the tape in a direction perpendicular to the sheet of FIG. 1B. When this write operation is complete the tape is stepped (moved the width of one or more tracks and stopped) and another write operation occurs. This process of stepping and writing continues until the tape is full or there are no more write operations to perform.

There are several disadvantages associated with this conventional design. One disadvantage is that data can not be written to the tape while it is moving. Instead, the tape is stationary during the recording process, and the lens is scanned across the width of the tape. This necessarily requires more time than would be required to record on a moving tape because of the time associated with starting and stopping the tape.

Another disadvantage, illustrated in FIG. 1C, is that a dirt particle 144 trapped between tape 122 and contour 102 can cause a perturbations in the tape surface known as a "tent" 152. If large enough, tent 152 can cause the tape to fall outside the focal plane of the objective lens. This can result in data errors. By increasing the spacing H, the impact of trapped dirt particles 144 on the write/read process can be minimized. However, as H increases so does the tape sensitivity to low frequency excitations. This can result in tape vibrations referred to as tape flutter. When the tape flutter amplitude becomes excessive write/read errors can occur.

The tape flutter problem is intensified when the tape is moving. This contributes to the impracticality of using this conventional focal plane stabilizer design in systems that write and read to moving tapes. In fact, because of tape flutter, it is virtually impossible to read and write at a desired tape speed of four meters per second (4 m/s).

Radius contour tape heads are also used in the magnetic tape industry. FIG. 2 is a diagram illustrating one conventional magnetic tape head design. Referring now to FIG. 2, a tape head contour 202A is provided to write data to a magnetic tape passing across the tape head. A write gap 222 centered on contour 202A writes data to the tape. The apex of the contour 202A and the gap 222 need not coincide. The radius of the contour 202A affects the flying height of the tape. Bleed slots 230 are often provided to further adjust the flying height.

If both read and write operations are desired, a second contour 202B is added. Contour 202B includes a read gap 224 centered thereon and used to read data from a magnetic tape passing over contour 202B. According to this design, the critical area for tape stability is in the area of the gaps of contours 202A and 202B. Two adjacent contours are used to allow both read and write operations to take place simultaneously.

This conventional magnetic tape head configuration is illustrated and described in the article "Historical Perspective of Tape Head Contours" by F. William Hahn, Jr., pg. 23, date unknown. The article, published in *Tribology and Mechanics of Magnetic Storage. Systems,* is incorporated herein by reference.

SUMMARY OF THE INVENTION

The present invention is a dual apex optical tape stabilizer used to stabilize an optical tape in a focal plane area of an objective lens for read and write operations. In one embodiment, the stabilizer comprises two adjacent contours across which the tape is transported. The radii of the contours and the separation of the contour apexes are chosen to optimize tape stability for a given tape tension and velocity.

An objective lens is used to focus a light beam on to the tape. During write operations, the light is used to alter the tape so that data is stored thereon. During read operations, the focused light is reflected or refracted from the altered tape so that data can be read. The dual apex stabilizer minimizes the flutter in the tape between the apexes to provide a stable tape surface for read and write operations. As a result, the tape surface is maintained at or near the focal plane of the objective lens.

In a preferred embodiment, the objective lens focuses the light at close to the center of the tape segment suspended between the apexes of the contours. This area provides maximum tape stability. Over the radius contours and close to the apexes, tape tents can be caused by dirt or dust particles. Such tape perturbations could disrupt the recording process. Effects of tents are less severe midway between the two apexes.

One advantage of the present invention is that it is relatively immune to tape flutter that can occur in the conventional design depicted in FIG. 1A. This advantage is attributed to the fact that the air bearing layers over the radius contours of the dual apex stabilizer act like stiff spring foundations to dampen tape vibrations.

A further advantage of the present invention is that the air bearings over the radius contours are hydrodynamic as opposed to the hydrostatic bearing of FIG. 1A. This results in a cost savings. The dual apex stabilizer is easier to manufacture than the conventional stabilizer with air holes, and a source of air pressure is not required.

Another advantage of the invention is that read and write operations can be performed with a moving tape. In one embodiment, the desired tape speed is 4 m/s. This is an improvement over the conventional design depicted in FIG. 1A where the tape had to be stationary for recording to occur.

Yet another advantage of the invention is that it is relatively insensitive to dirt particles on the backside of the tape and radius contour imperfections. If a dirt particle is present on the backside of the tape or on top of the contour, a tape tent is formed at the contour. Because the read and write operations occur between the apexes (as opposed to at either contour) the effects of dirt particles are minimized.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE EMBODIMENTS

The present invention is directed toward an optical tape focal plane stabilizer used to provide a stable tape surface for read and write operations. The stabilizer uses a double hump contour to provide a stable tape surface in this focal plane area. Thus, the stabilizer can be referred to as a dual-apex stabilizer.

The critical area for tape stability is the area of the tape where light is focused for read and write operations. This area is referred to as the focal plane area. According to a preferred embodiment, the focal plane area is positioned between the apexes of the two contours. This is an area where maximum stability is achieved.

Figure 1A:
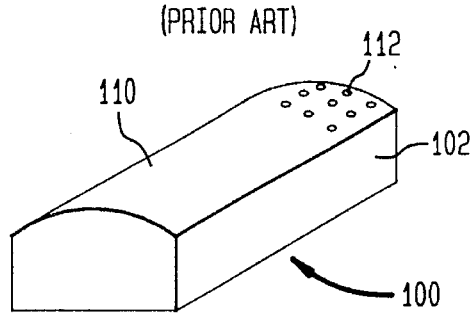
FIG. 1A is a diagram illustrating a conventional optical tape stabilizer using air holes to provide an air bearing layer.
Figure 1B:
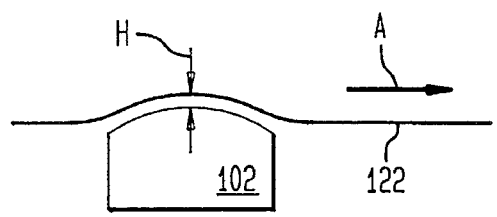
FIG. 1B is a diagram illustrating the operation of the conventional stabilizer depicted in FIG. 1A.
Figure 1C:
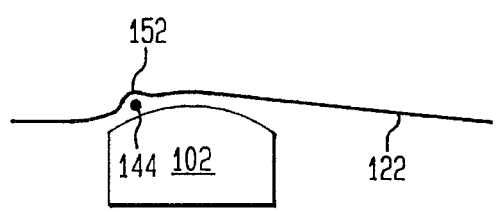
FIG. 1C is a diagram illustrating the effect of a dirt particle on the conventional stabilizer depicted in FIG. 1A.
Figure 2:
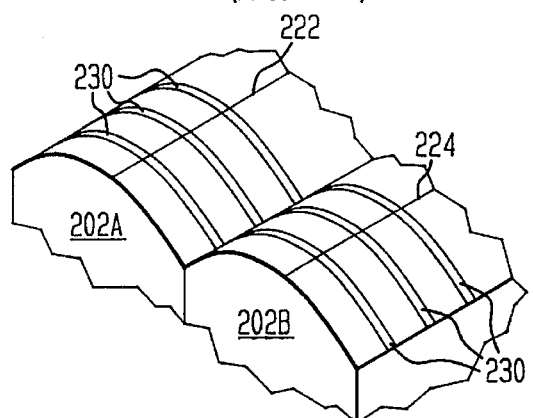
FIG. 2 is a diagram illustrating a double hump slotted contour used in magnetic tape operations.
Figure 3:
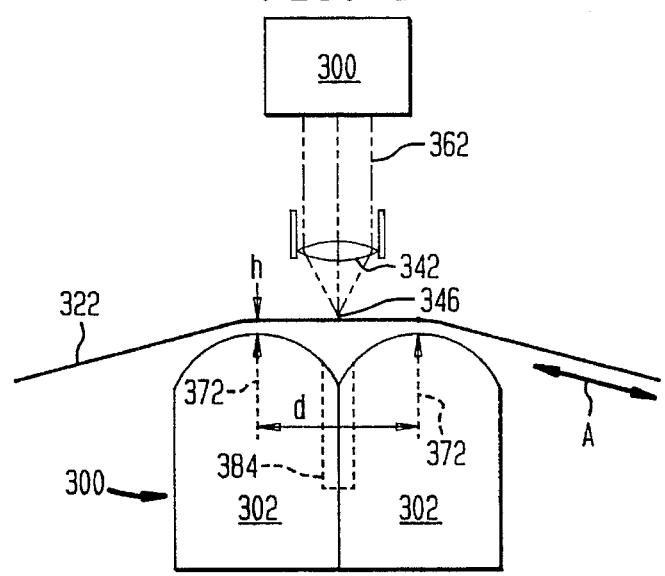
FIG. 3 is a diagram illustrating the focal plane stabilizer according to one embodiment of the present invention.

The focal plane stabilizer of the present invention is illustrated in FIG. 3. Referring now to FIG. 3, a dual apex stabilizer 300 comprises two contours 302. Each contour has an apex, indicated by dashed arrow 372. The apexes are separated by a distance d.

An optical tape 322 passes across stabilizer 300 in a direction indicated by arrow A. An objective lens 342 focuses a beam of light 362 onto optical tape 322 at a point 346. Point 346 is focused so that it is coincident with the surface of optical tape 322. Point 346 can be positioned anywhere in an imaginary plane between the apexes (at a height h). In a preferred embodiment, point 346 is positioned midway between apexes 302. In other words, in the preferred embodiment, point 346 is d/2 from either apex.

Light beam 362 is preferably generated from a coherent light source such as a laser 366. The light beam 362 is modulated to write data to tape 322. For example, in a digital or binary system, the data written at any given point 346 can be either a binary one or a binary zero. The invention, however, is not limited to digital applications.

In one embodiment, the tape travels in direction A, and point 346 remains fixed in space. In this manner, one track of data is written to the tape in a single "line" along the length of the tape. When the end of the tape is reached, objective lens is adjusted so that point 346 is moved across the tape (perpendicular to the sheet of FIG. 3) by one track width. As the tape moves back in the opposite direction, another track is written next to the first. In this manner, tracks of data can be written to the tape while it is moving. Preferably, the tape velocity is relatively constant at 4 m/s, although other speeds are contemplated as well.

As stated above, this yields the advantage that tape 322 does not have to be stopped and started as it travels in the A direction. Even a tape 322 moving at 4 m/s is highly stable in the focal plane area such that high accuracies are maintained.

A plurality of light sources 366 and objective lenses 342 could be used to write multiple tracks along tape 322 simultaneously as it moves in the A direction.

As optical tape 322 moves across stabilizer 300, a cushion of air accumulates between tape 322 and the contours 302. This air cushion is a hydrodynamic air bearing created by the motion of the tape across the contour 302. The air cushion suspends optical tape 322 over contours 302 and provides a stable tape surface in the focal plane area. In this manner, the light can be properly focused at point 346 on the tape.

Figure 4:
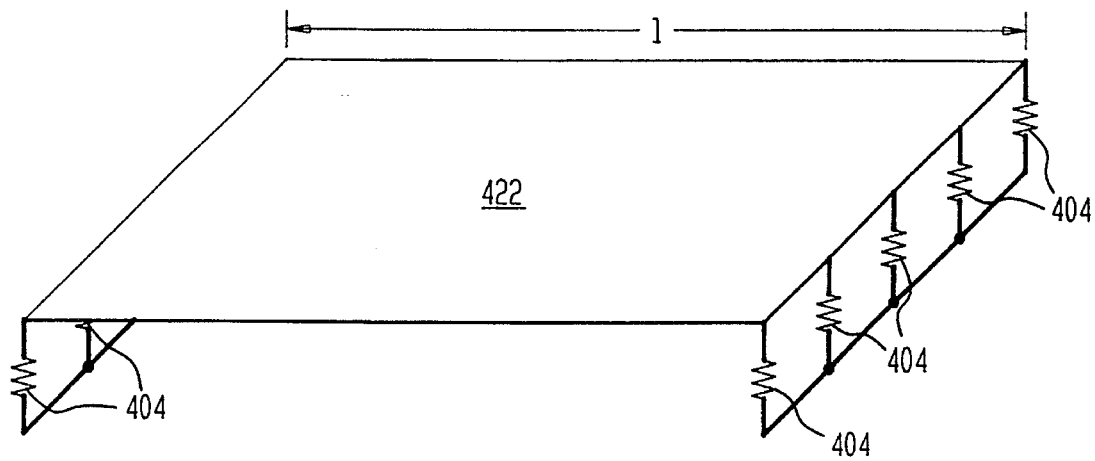
FIG. 4 is a diagram illustrating a system used to model the behavior of the optical tape in the focal plane area.

The behavior of the tape surface in the focal plane area can be approximated by studying the response of an equivalent short plate with stiff edge springs. Such a model is illustrated in FIG. 4. Referring now to FIG. 4, in this model, the springs 404 at the edge of plate 422 approximate the behavior of the air bearing over contours 302. The stiffness k of the air bearing (and thus the springs 404) is inversely proportional to the square of the height h of the air bearing as given by:

$$k \alpha \frac{1}{h^2}$$

Additionally, as the stability of the plate is inversely proportional to the length l of the span, the stability of the tape in the focal plane area is inversely proportional to the distance d between the apexes of contours 302.

The flying height h of the tape in millimeters (mm) is given by:

$$h = 0.643(R) \left( \frac{6\mu V}{T} \right)^{2/3}$$

Where R is the radius of curvature of contours 302 (mm), V is the velocity of the tape 322 (m/s), T is the tension on the tape (Newtons/meter), and $\mu$ is the viscosity of air (Newton-seconds/meter$^2$).

The inventors have determined that a preferred bearing height h is approximately 2–3/$\mu$m (0.002–0.003 ram). In a preferred embodiment, the tape velocity V is four meters per second (4 m/s) and the tension is approximately 88 Newtons per meter. To obtain the preferred flying height h in the preferred embodiment, the radius of curvature R of each contour is approximately 20 millimeters (ram).

Figure 5:
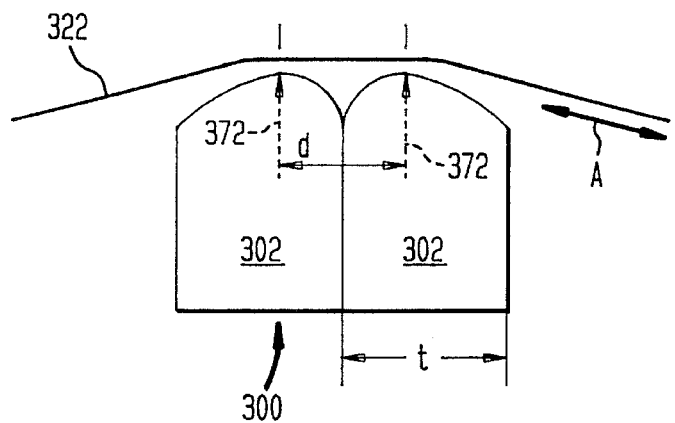
FIG. 5 is a diagram illustrating a preferred implementation of the focal plane stabilizer.

FIG. 5 illustrates a preferred implementation of stabilizer 300. This stabilizer 300 is implemented such that the apexes of contours 302 are separated by a distance d of 0.030 inches (0.762 ram) (each one being 0.015 inches (0.381 ram) from the intersection of contours 302). The thickness t of each contour is 0.150 inches (3.81 mm).

It should be noted that the radius of curvature R and the spacing d of the apexes can be adjusted to attain a given flying height and air bearing stiffness at a given tape velocity.

Figure 6:
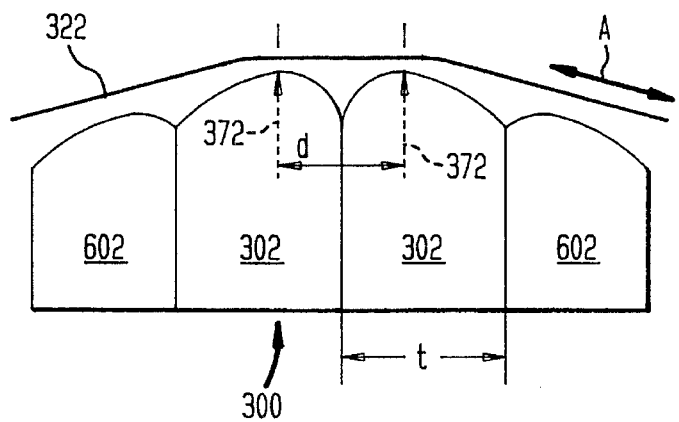
FIG. 6 is a diagram illustrating additional contours for increased stability.

Referring to FIG. 6, additional stability can be achieved by providing a second pair of contours 602, one on either side of stabilizer 300. These outside contours serve as coarse stabilizers to remove large perturbations in the tape. The inside contours perform fine stabilizing to further smooth the tape in the focal plane area.

An alternative embodiment is considered wherein the light source and objective lens are positioned under optical tape 322, between the apexes of contours 322. In this alternative embodiment, the light is focused onto the bottom surface of the optical tape 322. Two ways to implement the alternative are to provide a transparent portion to the top surface of contours 302 or to leave a gap between contours 302 in which to mount the optics (e.g., dashed lines 384).

This alternative is in contrast to the embodiment pictured in FIG. 3, where light source 366 and objective lens 342 are above contours 302 and tape 322 and light is focused on the top of tape 322. It should be noted that the terms "above," "below," "top," and "bottom" refer to the orientation of stabilizer 300 as illustrated in FIG. 3. These terms should not be interpreted to restrict the invention to any specific spatial orientation. In this alternative, the light source could be housed within stabilizer 300 (e.g., between or built into one of the contours 302).

While various embodiments of 1L the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical tape head for writing data to and/or reading data from an optical tape, comprising:

a first contour defining a first curved surface;

a second contour, adjacent to said first contour, defining a second curved surface, wherein motion of the tape across said first and second contours causes a hydrodynamic air bearing to form between said first curved surface and said tape, and between said second curved surface and said tape, thereby suspending said tape over said contours and providing a stable tape surface in a focal plane area between an apex of said first curved surface and an apex of said second curved surface; and an objective lens, positioned to focus light onto the optical tape at a point on the tape in said focal plane and between said apexes to thereby allow data to be read from and/or written to the optical tape.

2. The optical tape head of claim 1, wherein a radius of curvature of said contours is approximately 20 millimeters.

3. The optical tape head of claim 1, wherein said apex of said first contour is separated from said apex of said second contour by approximately 0.030 inches (~0.762 millimeters).

4. The optical tape head of claim 1, further comprising:

a third contour, adjacent to said first contour, defining a third curved surface;

a fourth contour, adjacent to said second contour, defining a fourth curved surface;

wherein said motion of the optical tape across said third and fourth contours removes large perturbations in the optical tape.

5. The optical tape head of claim 1, wherein said objective lens is positioned above said contours such that light is focused onto a top surface of the optical tape.

6. The optical tape head of claim 1, wherein said objective lens is positioned between said contours such that light is focused onto a bottom surface of the optical tape.

7. The optical tape head of claim 6, further comprising a light source configured to produce said light focused by said objective lens.

8. The optical tape head of claim 7, wherein said light source is housed within at least one of said contours.

9. The optical tape head of claim 1, further comprising a light source configured to produce said light focused by said objective lens.

10. The optical tape head of claim 1, further comprising at least one additional objective lens to focus light onto the optical tape such that a plurality of tracks can be written and/or read simultaneously.

11. The optical tape head of claim 10, further comprising at least two light sources, configured to provide said light to said objective lenses.

* * * * *